United States Patent
Hansen et al.

(10) Patent No.: US 10,969,980 B2
(45) Date of Patent: Apr. 6, 2021

(54) ENFORCING UNIQUE PAGE TABLE PERMISSIONS WITH SHARED PAGE TABLES

(71) Applicant: Intel Corporation, Santa Clara, CA (US)

(72) Inventors: David Hansen, Portland, OR (US); Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 16/367,944

(22) Filed: Mar. 28, 2019

(65) Prior Publication Data

US 2020/0310665 A1 Oct. 1, 2020

(51) Int. Cl.
*G06F 12/00* (2006.01)
*G06F 3/06* (2006.01)

(52) U.S. Cl.
CPC .......... *G06F 3/0637* (2013.01); *G06F 3/0622* (2013.01); *G06F 3/0644* (2013.01); *G06F 3/0673* (2013.01)

(58) Field of Classification Search
CPC .... G06F 3/0637; G06F 3/0622; G06F 3/0644; G06F 3/0673; G06F 12/1009
See application file for complete search history.

(56) References Cited

U.S. PATENT DOCUMENTS

2014/0331019 A1* 11/2014 Parker ................ G06F 12/1458
711/163
2014/0337585 A1 11/2014 Grisenthwaite et al.
2016/0019168 A1 1/2016 Rychlik et al.

OTHER PUBLICATIONS

European Search Report and Search Opinion, EP App. No. 20151082.3, dated Jul. 31, 2020, 06 pages.

* cited by examiner

*Primary Examiner* — Shawn X Gu
(74) *Attorney, Agent, or Firm* — Nicholson De Vos Webster & Elliott LLP

(57) ABSTRACT

A processor includes a processing core; a filter register to store a first permissions filter; and a memory management unit (MMU), coupled to the processing core, the filter register and a first peripheral device associated with the first permissions filter, wherein the MMU comprises a logic circuit to manage a shared page table comprising entries corresponding to the processing core and the first peripheral device, wherein the logic circuit is to: receive a memory access request for a first page of memory from the first peripheral device; determine whether the set of permission bits of the first entry match a first combination of bits of the first permissions filter; grant the memory access request if the set of permission bits match the first combination of bits of the first permissions filter; and cause a page fault if the set of permission bits do not matching the first combination of bits.

17 Claims, 12 Drawing Sheets

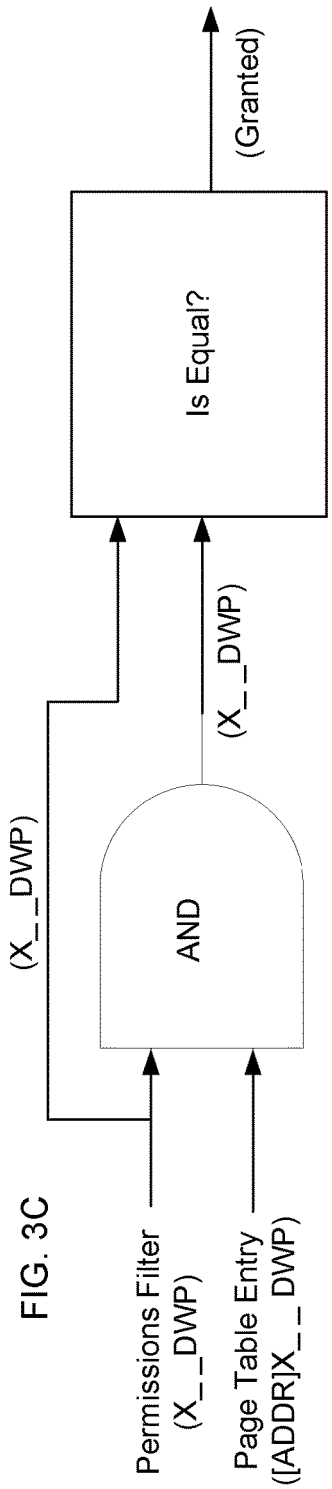

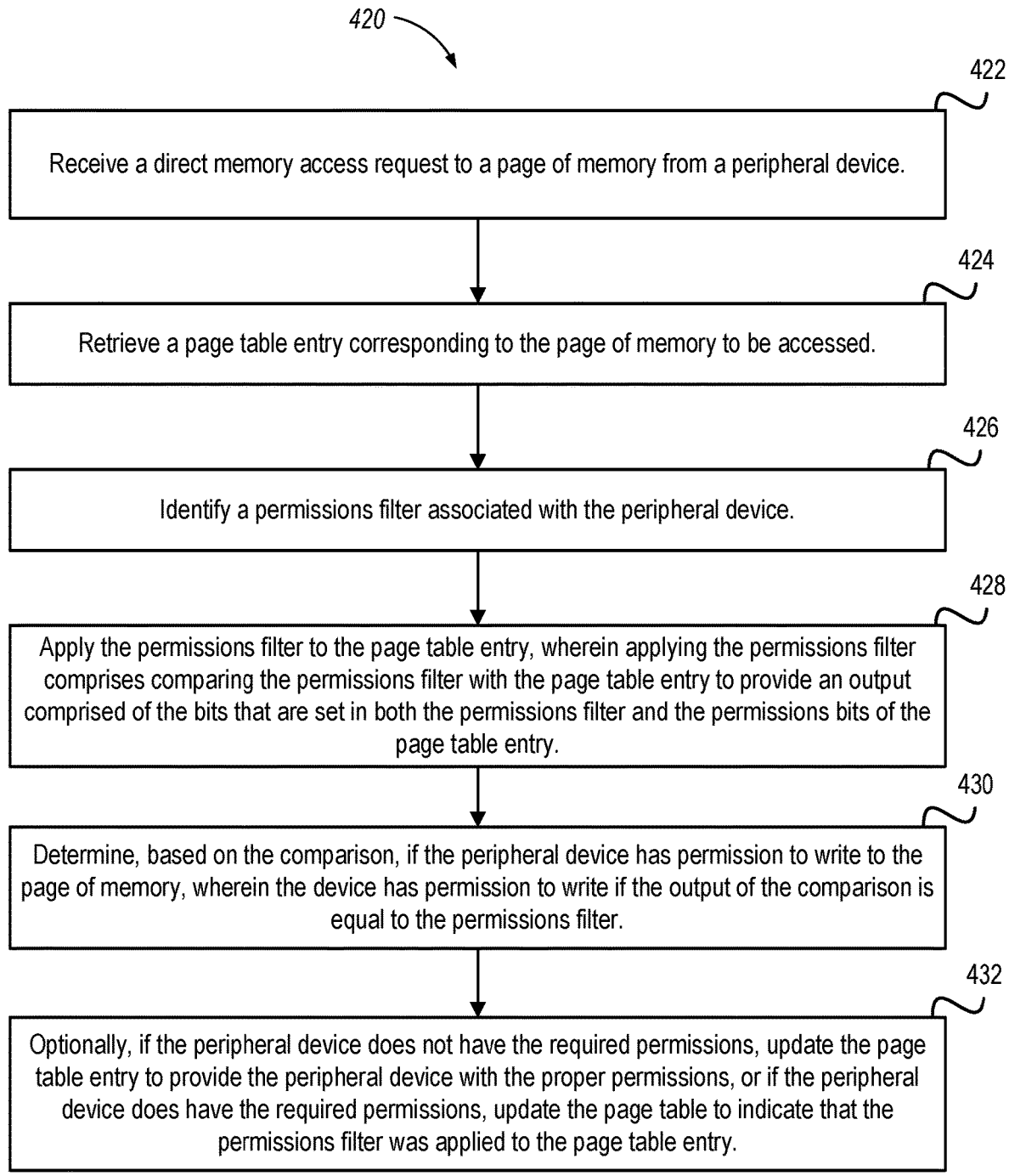

ENFORCING UNIQUE PAGE TABLE PERMISSIONS WITH SHARED PAGE TABLES

TECHNICAL FIELD

The present disclosure pertains to computer systems; more specifically, to memory access permissions of a computer system.

BACKGROUND

Computer systems may use a process referred to as paging to map a virtual contiguous address space used by an application or process to a physical address of memory where the data is stored. Paging uses a data structure known as a page table to map from the virtual address space to the physical address space. Devices peripheral to a central processing unit (CPU) of the computer system may access memory directly without communicating with the CPU. These peripheral devices may also use page tables to map from a virtual address space to the physical address space in memory. The CPU can use a memory management unit (MMU) to access memory. Peripheral devices can use an input/output memory management unit (IOMMU) to directly access memory of the computer system.

BRIEF DESCRIPTION OF THE DRAWINGS

FIG. 3A is an example permissions filter register storing a number of different permissions filters according to one implementation.

FIG. 3B is an example page table illustrating a number of page table entries.

FIG. 3C is an example logic circuit for applying a permissions filter to a page table entry according to one implementation.

FIG. 4B is a detailed flow diagram illustrating an example method for using permissions filters to provide devices with unique access permissions using a shared page table according to one implementation.

DETAILED DESCRIPTION

Peripheral devices of a computer system may be able to directly access memory of the system. To directly access memory a peripheral device may need to consult a page table to map to a physical address of memory. A page table may refer to any memory translation structure, such as a hash table, tree, table, etc. Currently, if a device is using the same page table as the CPU to access memory then the device must have the same access permissions, or "view," of that memory as the CPU. This means that if the CPU has access to read and write to a page of memory then so does the device that is using the same page table. To solve this problem each device may use a separate page table to allow different memory access permissions. However, using separate page tables is wasteful because there are two copies of the same structure in the system. Thus, it would be advantageous for different devices to use a shared page table to access memory and to define different access permissions for devices sharing the same page table.

Disclosed are systems and methods for enforcing unique page table permissions with shared page tables. For each device, or CPU, accessing memory of the system a separate filter may be used to determine, from a single page table, each device's or CPU's memory access permissions to a page of memory. Memory access permissions filters may be associated with a device or CPU to allow the device or CPU to have its own particular view of memory. A filter may include one or more bits, referred to as "software bits," that define which bits of a page table entry indicate permissions for a particular device or CPU.

For example, in one implementation a first bit may be the bit that allows write permission for a first device. If a page table entry has the first bit set then the first device has write permissions, but if the first bit is not set then the first device does not have write permissions. The CPU may use a second bit that identifies permissions of the CPU. Alternatively, the CPU might not use such a filter and only use bits that are read by hardware (i.e. traditional Dirty/Write/Present bits). Therefore, the CPU may ignore the first bit, or other software bits, in determining permissions of the CPU. In this way the first device can have one view of memory, i.e. write permission when the first bit is set, while the CPU has another view of memory.

Additionally, unique permissions may be extended to any number of additional devices or CPUs using additional bits, or combinations of bits to determine the access permissions of the devices and CPUs. For example, the first device could have write permission if a first bit is set and a second device may have write permission if a second bit is set, and a third device may have write permission if a third bit is set, and so forth.

Figure 1:
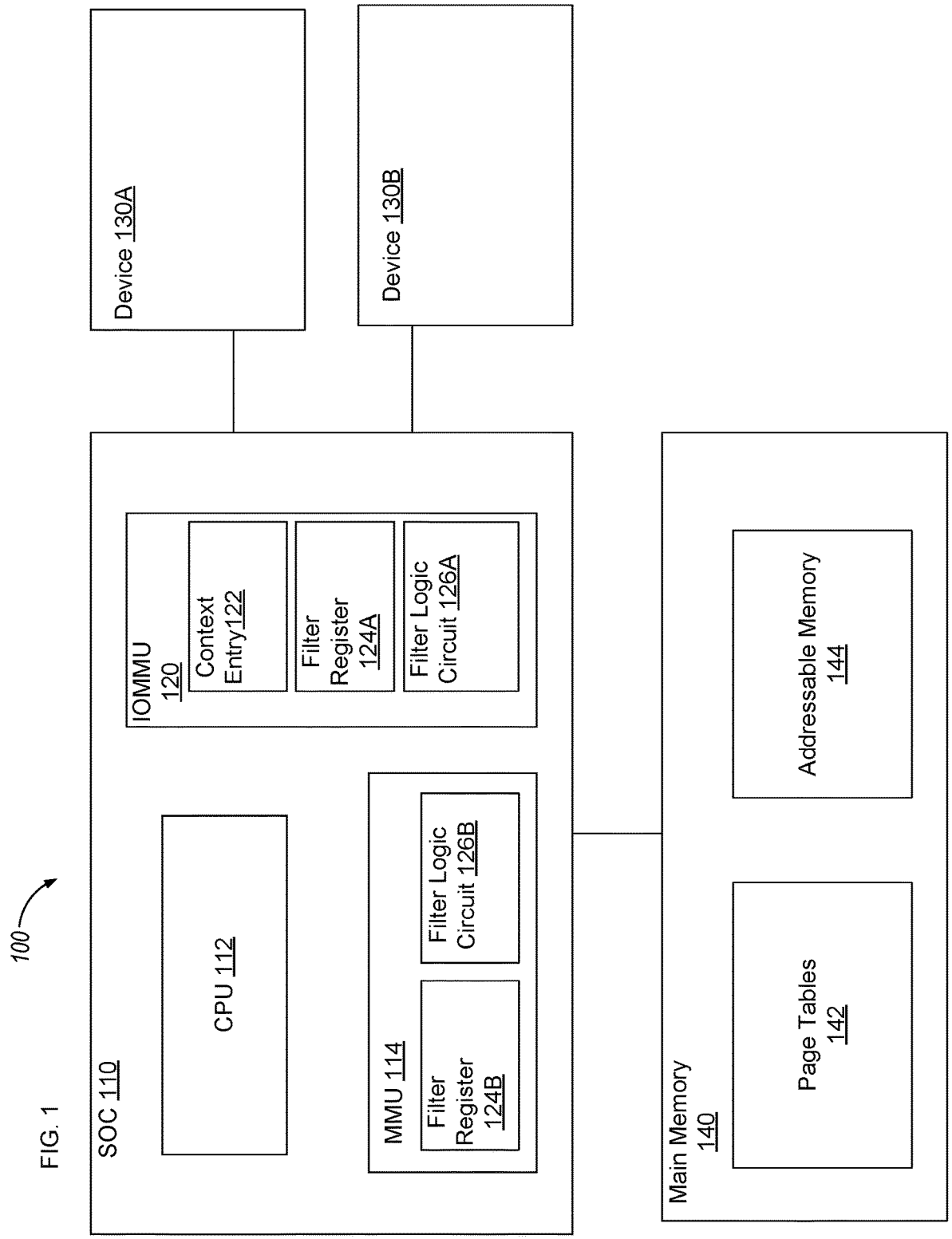
FIG. 1 is a system diagram illustrating a system-on-a-chip for using permissions filters to provide devices with unique access permissions to memory using a shared page table according to one implementation.

FIG. 1 is a block diagram illustrating a system 100 comprising a system-on-a-chip (SOC) 110, one or more peripheral devices 130A-B, and a main memory 140. The SOC 110 may comprise a central processing unit (CPU) 112, a memory management unit (MMU) 114, and an input/output memory management unit (IOMMU) 120. Although depicted as distinct, IOMMU 120 and MMU 114 may also be a single unit for memory management. Furthermore, although IOMMU 120 is depicted as within the SOC 110, it may also be located separate from the SOC 110. Main memory 140 may comprise one or more page tables 142 and addressable memory 144.

IOMMU 120 may comprise one or more context entries 122, a filter register 124A, and a filter logic circuit 126A. IOMMU 120 may receive memory access requests, including read requests and write requests, from devices 130A-B. After receiving a memory access request from one of the devices 130A-B, the IOMMU 120 may retrieve from main memory 140 a page table entry from the page tables 142. Once the IOMMU 120 retrieves the page table entry, the filter logic circuit 126A may retrieve a permissions filter from the filter register 124A to compare to the permissions indicated by a set of permissions bits of the page table entry. The set of permissions bits of the page table entry may include one or more software bits that can be set and read by software, and one or more hardware bits that may be read or set by hardware (e.g., the MMU 114). The software bits may be set by software to indicate the memory access permissions of the one or more devices 130A-B.

The CPU 112 may comprise one or more processor cores. The MMU 114 may be coupled to the CPU 112 and manage the CPU's 112 access to main memory 140. The MMU 114 may apply a permissions filter to the page table entry accessed by the CPU 112, or may simply use the traditional hardware bits of the page table entry to determine access permissions of the CPU 112. MMU 114 may additionally comprise a filter register 124B and a filter logic circuit 126B, both of which may function the same or similar to filter register 124A and filter logic circuit 126A, respectively.

The filter registers 124A-B may store one or more permissions filters associated with the one or more devices 130A-B and CPU 112. The permissions filters may comprise one or more bits associated with the software bits of the page table entry, and one or more bits corresponding to the hardware bits of a page table entry. The context entries 122 may comprise the root addresses of the page tables 142 that the devices 130A-B and/or the CPU 112 are mapped, or assigned, to and may be consulted to determine one or more permissions filters for each device 130A-B and CPU 112 (i.e., defines the software bits set for the filters associated with a device or CPU).

Filter logic circuit 126A-B may include logic to compare a permissions filter with the permissions bits of the page table entry and provide an output that is comprised of the bits of the permissions filter and the page table entry that are the same (i.e., a logical AND of the permissions filter and the page table entry). Once the output from the comparison is determined, the output may be compared to the permissions filter to determine if the device or CPU has the proper permissions. If the output and permissions filter are the same then the device or CPU has the proper permissions. If the output and the permissions filter are different, then the device or CPU does not have the proper permissions and the memory access request will cause a page fault and fail. After the filter is applied to the page table entry the filter logic circuit 126A-B may update the page table entry. In one example, if the request is failed the filter logic may update the page table entry to provide the device or CPU with the proper permissions. The page table entry may be updated in cases in which a notification is preferred before access is provided to the device or CPU to allow for memory optimization, media wear optimization, etc. Additionally, the page table may be updated to indicate that the permissions filter for a device or CPU was applied. For example, if the permissions filter for a first device has been used, the page table may be updated to prevent a second device from accessing the same memory. Although depicted as part of the IOMMU 120 and MMU 114, the filter logic circuit 126A-B may be implemented anywhere within the SOC 110 or system 100.

Devices 130A-B may be coupled to the IOMMU 120. The devices 130A-B may be any peripheral device, or hardware subsystem used by a computer system to perform any number of functions. The devices 130A-B may be, for example, disk drive controllers, graphics cards, network cards, or other devices capable of direct memory access. Main memory 140 may refer to any off-chip memory storage. Although the page tables 142 are depicted as residing in main memory 140, the page tables may be stored on or off chip, as well as on disk or in any other storage of the system that may be accessible by the MMU 114 and IOMMU 120.

Page tables 142 may refer to a memory translation data structure, such as a hash table, a data tree, or any other data structure. The page tables 142 may map contiguous virtual memory addresses used by an application or process to addresses in physical memory. Page table 142 may comprise a plurality of page table entries. Each page table entry may correspond to a mapping between a virtual page of memory and a physical page of memory. Each page of memory may comprise a number of smaller blocks of memory. When a process executing on a device or a CPU requests access to memory, the process may request access to memory using the virtual address which must be translated to the physical address. The MMU 114 or IOMMU 120 may perform a page walk to find the page table entry that maps the virtual page to the physical page. The actual physical address of the block of memory to be accessed may be determined by an offset provided by the virtual address added to a base address of the page. The page table entry may include, in addition to the physical address of the page of memory, a number of bits defining memory access permissions for the page. The bits defining memory access permissions for the page may be the bits that are compared to the permissions filter in the filter logic circuit.

Addressable memory 144 may refer to any memory of the system to which a process may store, access, and retrieve data and/or code. Addressable memory 144 contrasts with the memory of the page tables 142 in that the memory used to store the page tables may be used only for page tables and associated information. A page to which access is requested by the CPU 112 or devices 130A-B may be stored in addressable memory 144.

Figure 2:
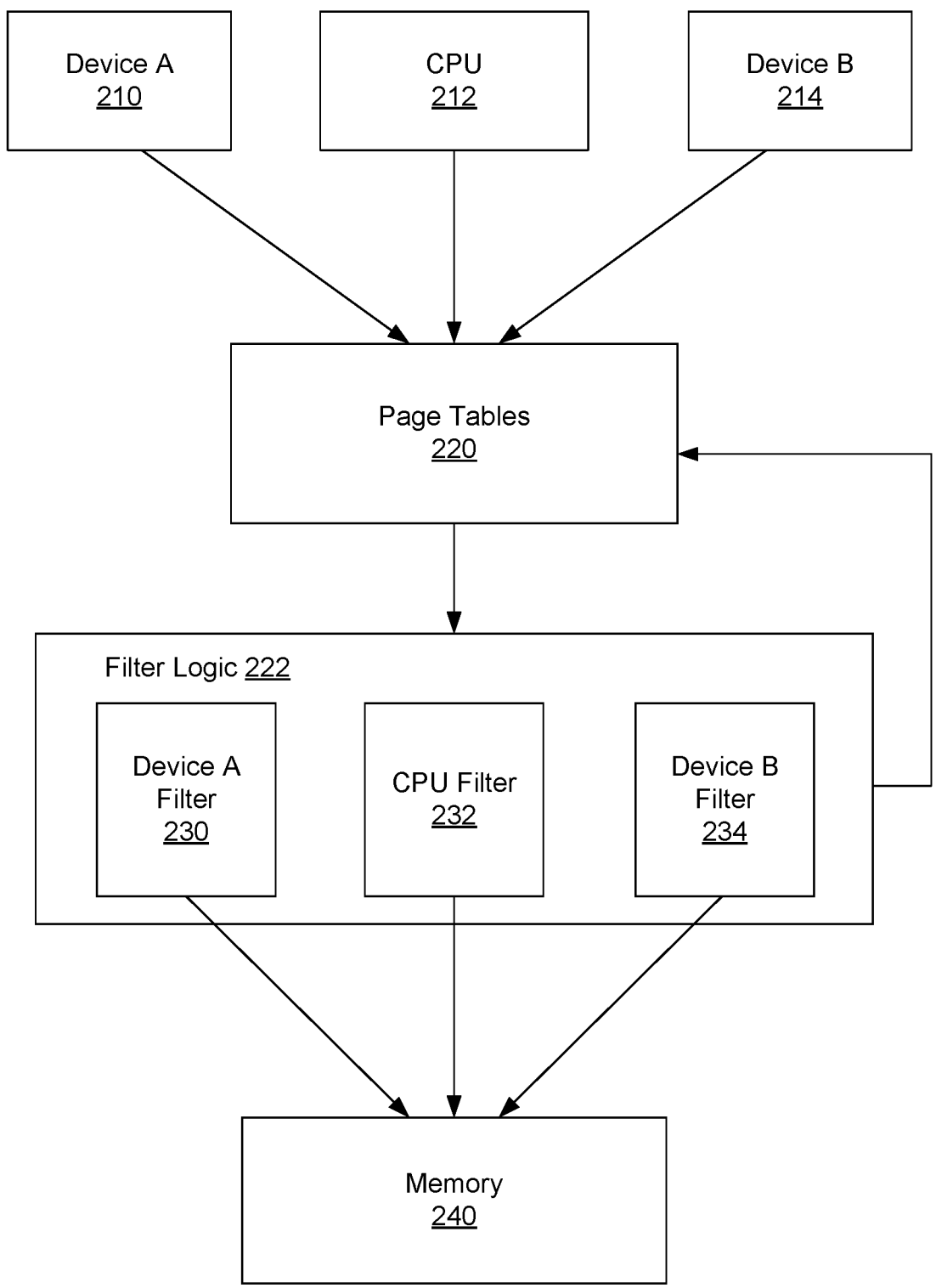
FIG. 2 is a block diagram illustrating the logical process flow for applying permissions filters associated with different devices to allow unique access permissions to memory according to one implementation.

FIG. 2 is a flow diagram illustrating a logical process flow 200 of applying permissions filters to one or more devices and CPUs using a shared page table. Device A 210, device B 214, and CPU 212, may access memory using the same page table, or page tables 220. Page tables 220, Device A 210, device B, and CPU 212 may be similar to or the same as page tables 142, device 130A, device 130B, and CPU 112, respectively, as described with respect to FIG. 1. A page table 220 may comprise a plurality of page table entries. Each page table entry corresponds to a mapping between a virtual page of memory and a physical page of memory. Each page of memory may comprise a number of smaller blocks of memory. When a process executing on a device or a CPU requests access to memory, the process requests access to memory using the virtual address which must be translated to the physical address. The MMU or IOMMU may perform a page walk to find the page table entry that maps the virtual page to the physical page. The actual physical address of the block of memory to be accessed may be determined by an offset provided by the virtual address added to base address of the page given by the page table entry. The page table entry may include, in addition to the physical address of the page of memory, a number of bits defining memory access permissions for the page.

Filter logic 222 may be similar to or the same as the logic of filter logic circuits 126A-B, as described with respect to FIG. 1. Filter logic 222, upon a memory access request, may apply a different permissions filter to the page table entries of the page tables 220 used by device A 210, device B 214, and CPU 212. For a memory access request from device A 210, the filter logic may apply device A filter 230 to provide device A 210 with unique access permission, independent of the permissions provided to CPU 212 and device B 214. For a memory access request from CPU 212, the filter logic 222 may apply CPU filter 232 to provide CPU 212 with its own unique permissions, independent of the permissions provided to device A 210 and device B 214. For a memory access request from device B 214, the filer logic 222 may apply device B filter 234 to provide device B 214 with its own unique permissions, independent of the permissions provided to device A 230 and CPU 212. After application of the filters to the page table entries, the devices and CPU may each have independent permissions to access the respective pages in memory 240.

In one implementation, a notification before a device or CPU writes to a page for the first time may be preferred (e.g., to do memory optimization or to optimize media wear or write bandwidth). Initially, the permission bits of the page table entry may not allow the device or CPU to write to the page. However, after the application of the filter and the failure of the write request, the filter logic may update the page table entry permission bits to give the device or CPU write permissions for the page. For example, if the device A filter 230 has a software bit "X" set, and the corresponding "X" bit of the page table entry is not set, then when the device requests to write to the page there will be a fault. After the fault, memory optimization may be done and the logic may update the page table entry by setting the "X" bit. The next time device A 210 attempts to write to the page of memory, it will have write permissions because the "X" bit of the page table entry of that page would be set.

In one implementation, each device or CPU may have an assigned bit (the associated filter will include the bit). If the assigned bit is set in the page table entry then the device or CPU will have write permissions to the page of memory associated with the page table entry. In another implementation, a device or CPU may be assigned a combination of bits that must be set in the page table entry to allow write permissions for that device or CPU. In yet another implementation, more than one device or CPU may be assigned the same permissions filter and thus the same permissions. The MMU or IOMMU may include a root entry table which maps I/O devices to specified domains based on device ID, the I/O bus the device is associated with, etc. A domain may be associated with a context table which provides devices or CPUs with access to the page tables associated with each device or CPU. The context table may comprise one or more context entries which provides each I/O device or CPU with access to a particular page table. In one implementation, the context entry may further define the permissions filter to be associated with a device or CPU of the context entry. The permissions filter may then be applied to a page table entry when the device or CPU requests access to a page of memory. Multiple devices and/or CPUs may be associated with a single context entry and multiple devices and/or CPUs may be associated with a single permissions filter within the context entry.

FIG. 3A is an example filter register storing a number of permissions filters. FIG. 3A depicts 7 different filters, each using a different combination of three software bits (XYZ) along with the 3 hardware bits (DWP—Dirty/Write/Present). The filter register may store any number of filters and is not limited by the depiction of FIG. 3A. Each of the filters comprises a unique combination of the three software bits and thus, in this example, would allow seven different devices and/or CPUs an independent view of memory. This approach may be extended to an arbitrarily large number of bits, and thus an arbitrarily large number of independent views of memory.

As an example, Filter 1 may be associated with a device. Whenever the device requests to write to a page of memory, the page table entry corresponding to that page of memory will be retrieved. If the "X" permission bit of the page table entry is set, then the device has permission to write to the page of memory. However, if the "X" permission bit is not set then the device will not have write permissions to the page of memory. The same process applies to each filter. Additionally, multiple devices and/or CPUs may be assigned the same filter if the devices and CPUs require the same view of memory.

FIG. 3B is an example page table comprised of a number of page table entries.

As depicted, each page table entry may include a physical address of the page of memory ([ADDR]) and a set of bits defining memory access permissions to the page of memory. A set of software bits of the page table entry may be set by software to provide access permissions to appropriate devices and CPUs. The bits that are set may be associated with a device or CPU that requires write permissions to the page of memory while other bits may not be set to prevent other devices or CPUs from writing to the page of memory.

For example, Entry 1 has an "X" software bit set while the "Y" and "Z" software bits are not set. Therefore, any device or CPU associated with Filter 1 of FIG. 3A (i.e. has the "X" bit set but no others) will have permission to write to the page of memory. However, devices or CPUs associated with other filters of FIG. 3A may not have permission to write to the page of memory.

FIG. 3C is an example logic circuit for application of a permissions filter to a page table entry. The logic circuit is depicted as a logical AND followed by an IS EQUAL comparator. An alternative depiction may comprise a logical AND for each of the bits of the inputs, followed by the IS EQUAL comparator. The initial inputs of the filter logic circuit are a permissions filter, such as a filter from FIG. 3A, and a page table entry, such as an entry from FIG. 3B. The initial inputs are put through a logical AND operation, meaning that all bits in the same position that are set in both inputs will also be set in the output. After the logical AND operation, the output of the logical AND operation and the permissions filter as initially input are compared to determine if they are equal (i.e. if the same bits that are set in one are set in the other, and the bits that are not set in one are not set in the other). If the result of the comparison is that the output and the permissions filter are equal, then the device or CPU associated with the filter has permission to write to the page of memory.

For example, if Filter 2 of FIG. 3A ("_Y_DWP") and Entry 2 of FIG. 3B ("[ADDR]_Y_DWP") are the inputs to the filter logic circuit then the output of the AND operation would be "_Y_DWP" because the "Y" bits are set in both, and the "DWP" bits are set in both. Then the inputs to the "Is Equal?" operation would be "_Y_DWP" (initial input/Filter 1) and "_Y_DWP" (the output of the logical AND). The two inputs both have the same bits set and therefore the result would be that write permission is allowed.

In another example, if Filter 7 of FIG. 3A ("XYZDWP") and Entry 1 of FIG. 3B ("[ADDR]X_ _DWP") are the initial inputs of the filter logic circuit then the output of the AND operation would be "X_ _DWP" because the "X" bit and the "DWP" bits are set in both. However, the "Y" and "Z" bits are set in Filter 7 but not in Entry 1. Next, the inputs to the "Is Equal?" operation would be the initial Filter 7 ("XYZDWP") and the output of the logical AND operation ("X_ _DWP"). The result of the "Is Equals?" operation would result in a failure of the write request because the inputs are not the same; the "Y" and "Z" bits are set in Filter 7 but not in the output of the logical AND operation. Therefore, the result would be that write permission is not allowed.

Figure 4A:
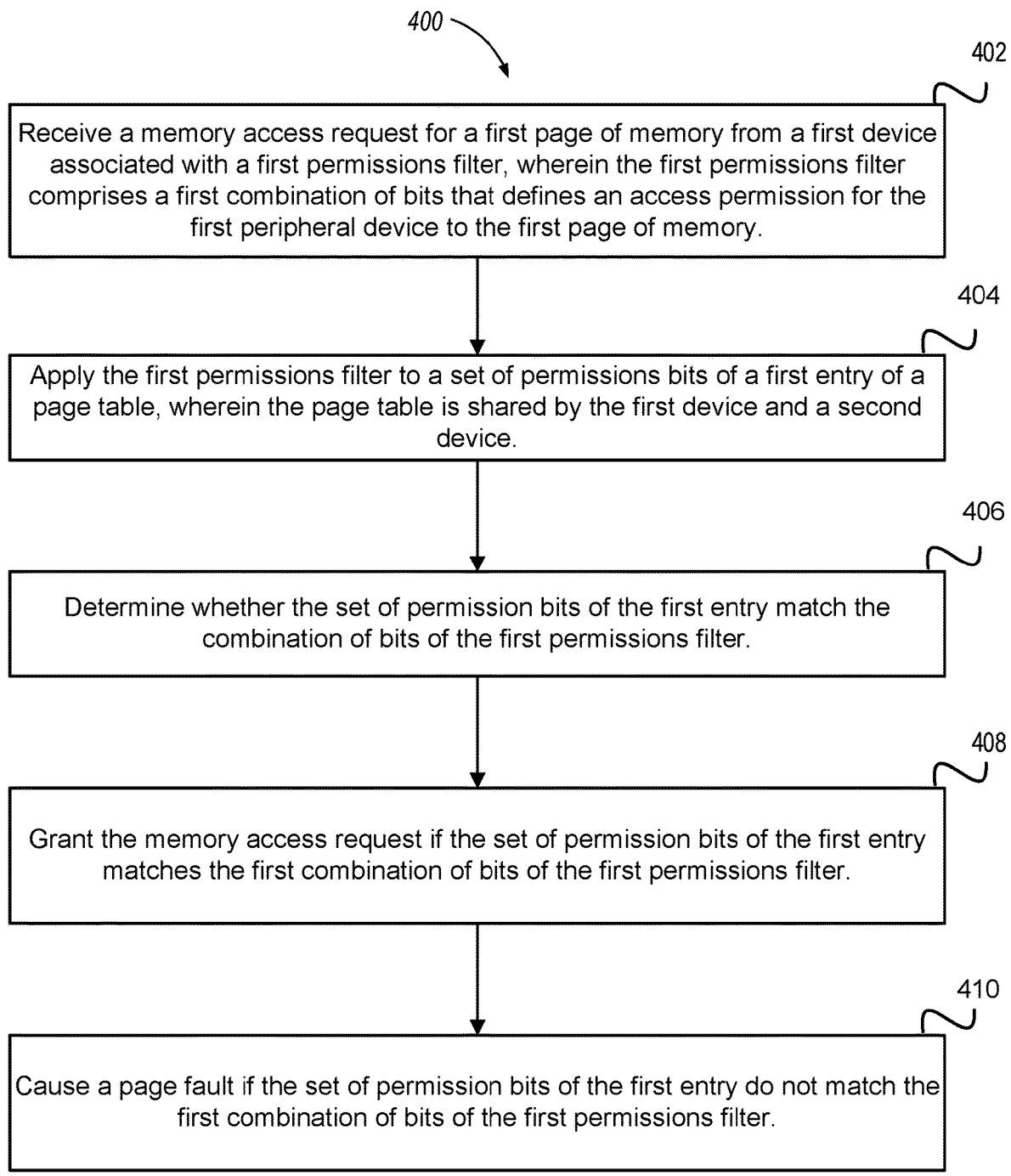
FIG. 4A is a flow diagram illustrating an example method for using permissions filters to provide devices with unique access permissions using a shared page table according to one implementation.

FIG. 4A is an example flow diagram for a method 400 of using permissions filters to provide devices or CPUs with independent permissions to memory using a shared page table. At block 402 a logic circuit may receive a memory access request for a first page of memory from a first peripheral device, the first peripheral device being associated with a first permissions filter. The permissions filter may comprise a first combination of bits that defines access permission for the first peripheral device to the first page of memory.

At block 404, the logic circuit may apply the first permissions filter to a set of permissions bits of a first entry of a page table. The page table may be shared by one or more devices and/or CPUs, such as the first device and a second device. The entry of the page table may provide a mapping to the physical address of the page of memory for which access was requested by the first peripheral device. The entry of the page table may further comprise one or more permissions bits which indicate the permissions provided to one or more devices or CPUs to access the page of memory. The one or more permissions bits may comprise a set of software bits used to define access permissions of one or more devices and/or CPUs and a set of hardware bits that provide for access permissions for legacy devices, legacy CPUs, or legacy processors. Legacy devices or CPUs may ignore the software bits and only read the hardware bits to determine memory access permissions. Additionally, a legacy processor may be a processor with no knowledge of permissions filters, which ignores the software bits, and only reads the hardware bits to determine access permissions.

At block 406, the logic circuit may determine whether the set of permission bits of the first entry match the combination of bits of the first permissions filter. In one example, the logic circuit compares a single corresponding bit of the set of permission bits of the first entry and the combination of bits of the first permissions filter. As is described below, if the bit matches then access may be allowed, but if the bit does not match access is not allowed. In another example, the logic circuit may compare the permissions filter with the page table entry to provide an output comprised of corresponding bits that are set in both the permissions filter and the page table entry (i.e. a logical AND operation for each corresponding bit). Then the output of the logical AND operation and the original permissions filter may be compared to determine if they match, or in other words, are equal. In an alternative embodiment, rather than a comparison of bits, a value of the filter may be compared to a list of values to determine if the device or CPU has access permissions. Additionally, software may be used as a filter to determine if a device or CPU has access permissions for a page of memory.

At block 408, the logic circuit may grant the memory access request if the set of permission bits of the first entry matches the first combination of bits of the first permissions filter. If the memory access request is granted, the first peripheral device may access the page of memory according to the access that was requested (e.g., read or write). At block 410, the logic circuit may cause a page fault if the set of permission bits of the first entry do not match the first combination of bits of the first permissions filter. Software may the handle the page fault to prevent access and to track what the cause of the page fault was (i.e., improper permissions).

FIG. 4B is an example flow diagram for a method 420 of using permissions filters to provide devices and CPUs with independent permissions to memory using a shared page table. At block 422, a memory management unit (MMU) may receive a direct memory access request to a page of memory from a peripheral device or a CPU. The MMU may be an input/output MMU that controls memory access of peripheral devices or may be an MMU that controls a CPU's access to memory. The CPU or peripheral device may request direct memory access through the MMU or IOMMU.

At block 424, the IOMMU may retrieve a page table entry corresponding to the page of memory to be accessed by the peripheral device or CPU. Retrieving the page table entry may comprise a page walk in which the IOMMU searches a page table to find the page table entry associated with a virtual address provided by a process executing on the peripheral device or CPU. Alternatively, the page table entry may be retrieved from a translation lookaside buffer (TLB) if it is stored in the TLB.

At block 426, the IOMMU may identify a permissions filter associated with the peripheral device or CPU. The permissions filter associated with a device or CPU may be determined by consulting a context entry of in the IOMMU or MMU for the peripheral device or CPU. The context entry may map the peripheral device or CPU to the page table, or tables, to be used by the peripheral device or CPU. The context entry may further associate the peripheral device or CPU with the permissions filter it will use in accessing memory through the page table.

At block 428, the IOMMU may apply the permissions filter to the page table entry. Applying the permissions filter to the page table entry may comprise comparing the permissions filter with the page table entry to provide an output comprised of the bits that are set in both the permissions filter and the page table entry (i.e. a logical AND operation for each corresponding bit). The output of the logical AND operation and the original permissions filter may be compared to determine if they match, or in other words, are equal.

At block 430, the IOMMU may determine if the peripheral device or CPU has permission to write to the page of memory. The output of the comparison at block 408 and the initial permissions filter may be compared to determine if they are equal, as discussed above at block 428. If they are equal then the peripheral device or CPU has permission to write (or whatever access is requested) to the page of memory. However, if they are not equal, then the write will fail and a page fault may be triggered.

At block 432, the IOMMU may update the page table entry to provide the peripheral device or CPU the proper permissions to allow the peripheral device or CPU to write to the page of memory. This step may be optional and may be set to occur for specific devices or CPUs in specified conditions. For example, it may be desired that a notification is triggered before access is allowed. The entry of the page table may initially deny access to the page but then update the entry to provide access once the filter is first applied. The notification may allow the system may do any number of housekeeping tasks, such as optimizing for media wear, before allowing the device or CPU to access the page of memory. In another example, it may be desired to update the page table to deny access to certain devices or CPUs after a first device or CPU has accessed the page of memory.

FIG. 5 is a block diagram illustrating a micro-architecture for a processor 500 that implements hardware support for enforcing unique page table permissions with shared page tables, according to an implementation. Specifically, processor 500 depicts an in-order architecture core and a register renaming logic, out-of-order issue/execution logic to be included in a processor according to at least one implementation of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may be part of a multiprocessor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different scheduler circuits, including reservations stations (RS), central instruction window, etc. The scheduler unit(s) 556 is coupled to the physical register set(s) unit(s) 558. Each of the physical register set(s) units 558 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 558 is overlapped by the retirement unit 554 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register set(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register set(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figures 5A, 5B:
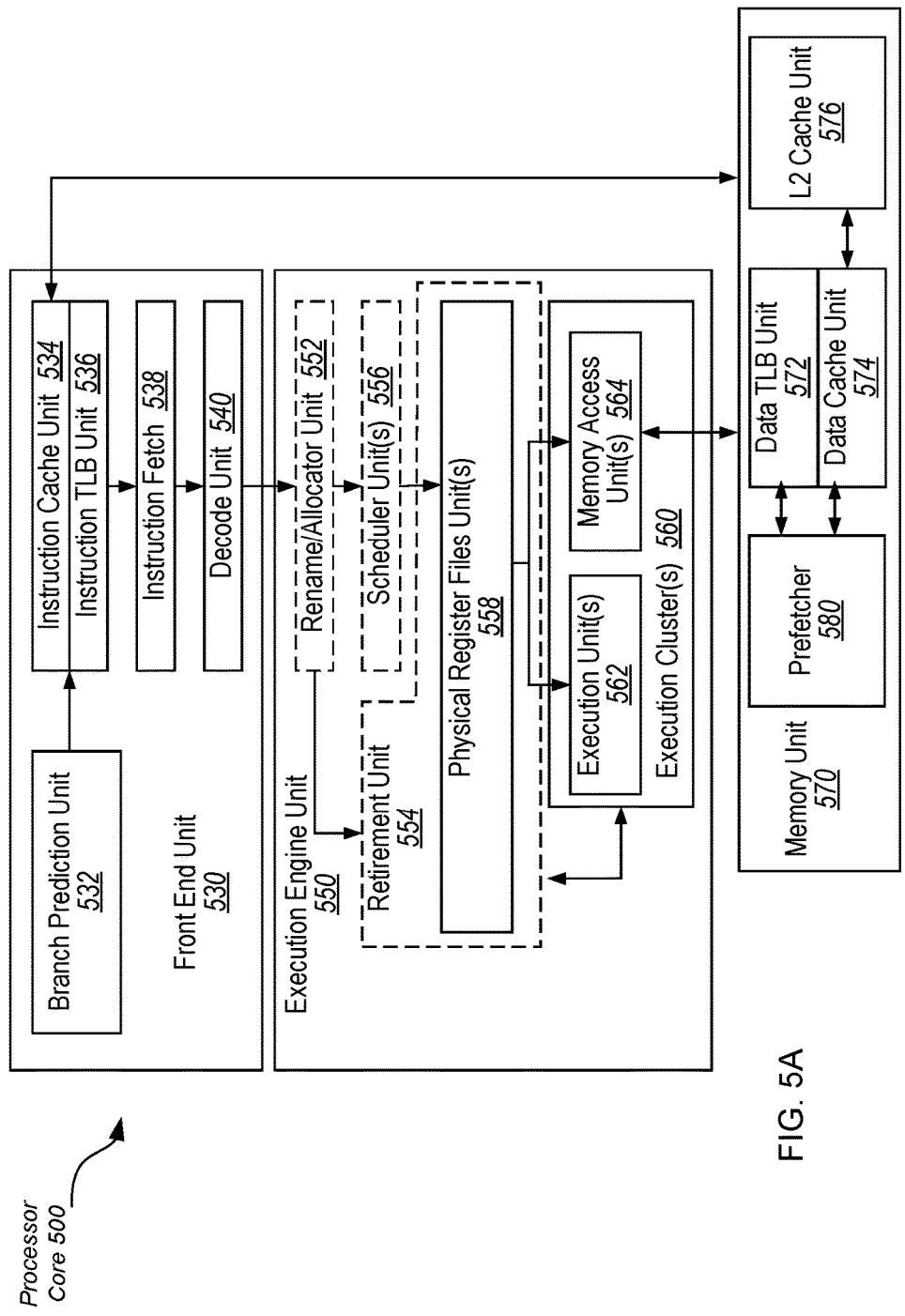
FIG. 5A is a block diagram illustrating an in-order pipeline and a register renaming stage, out-of-order issue/execution pipeline according to one implementation.
FIG. 5B is a block diagram illustrating a micro-architecture for a processor or an integrated circuit that may implement hardware support for a multi-key cryptographic engine, according to an implementation of the disclosure.

FIG. 5B is a block diagram illustrating an in-order pipeline and a register renaming stage, out-of-order issue/execution pipeline implemented by processor 500 of FIG. 5A according to some implementations of the disclosure. The solid lined boxes in FIG. 5B illustrate an in-order pipeline 501, while the dashed lined boxes illustrate a register renaming, out-of-order issue/execution pipeline 503. In FIG. 5B, the pipelines 501 and 503 include a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5B.

Figure 6:
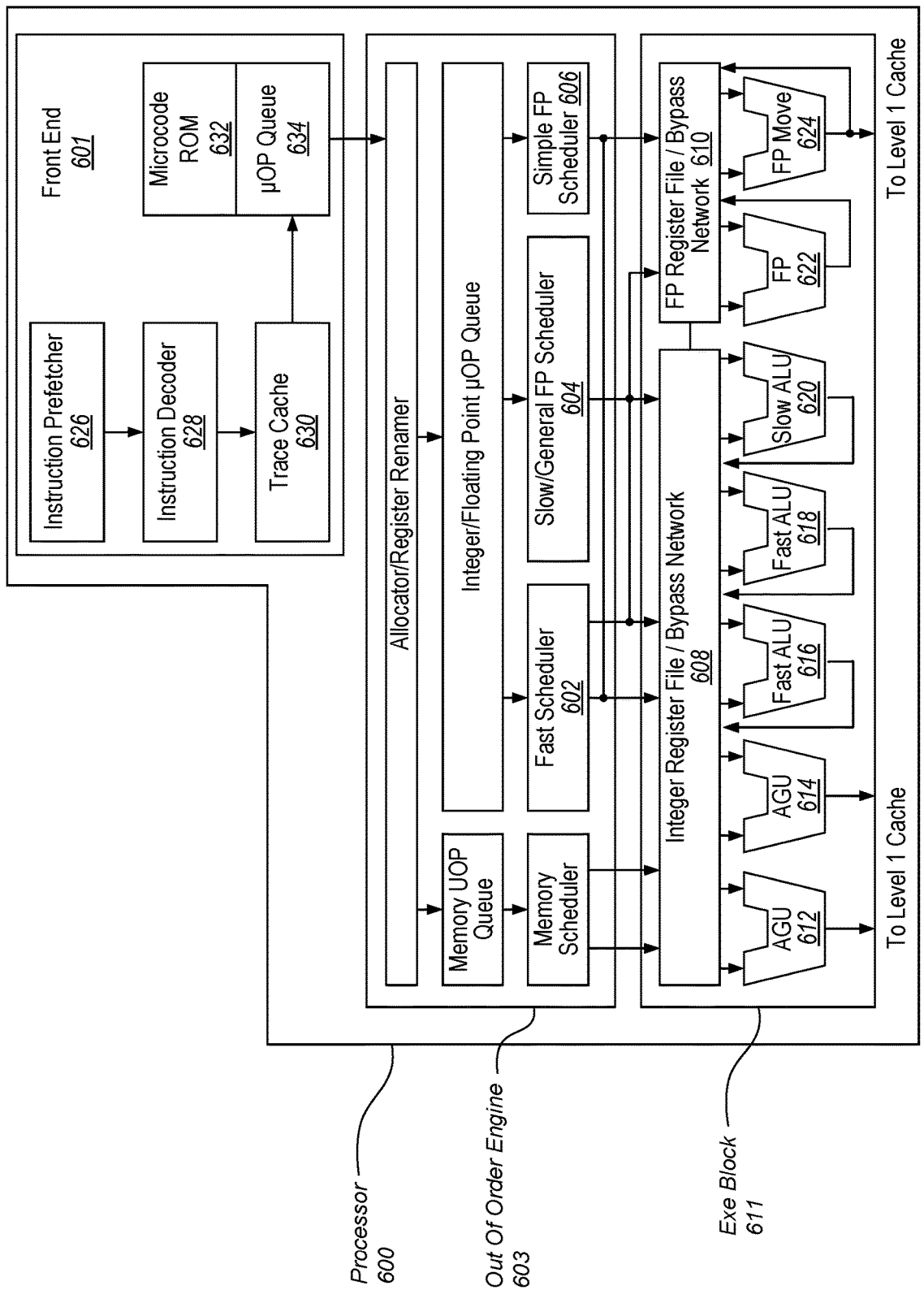
FIG. 6 illustrates a block diagram of the micro-architecture for a processor or an integrated circuit that implements hardware support for a multi-key cryptographic engine, according to an implementation of the disclosure.

FIG. 6 illustrates a block diagram of the micro-architecture for a processor 600 that includes logic circuits of a processor or an integrated circuit that implements hardware support for enforcing unique page table permissions with shared page tables, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline. The implementations of the page additions and content copying can be implemented in processor 600.

The front end 601 may include several units. In one implementation, the instruction prefetcher 616 fetches instructions from memory and feeds them to an instruction decoder 618 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, microcode ROM (or RAM) 632 provides the uops needed to complete the operation.

Some instructions are converted into a single micro-op, whereas others need several micro-ops to complete the full operation. In one implementation, if more than four micro-ops are needed to complete an instruction, the decoder 618 accesses the microcode ROM 632 to do the instruction. For one implementation, an instruction can be decoded into a small number of micro ops for processing at the instruction decoder 618. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register sets 608, 610, sit between the schedulers 602, 604, 606, and the execution units 612, 614, 616, 618, 620, 622, 624 in the execution block 611. There is a separate register set 608, 610, for integer and floating point operations, respectively. Each register set 608, 610, of one implementation also includes a bypass network that can bypass or forward just completed results that have not yet been written into the register set to new dependent uops. The integer register set 608 and the floating point register set 610 are also capable of communicating data with the other. For one implementation, the integer register set 608 is split into two separate register sets, one register set for the low order 32 bits of data and a second register set for the high order 32 bits of data. The floating point register set 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register sets 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 612, floating point move unit 614. For one implementation, the floating point execution blocks 612, 614, execute floating point, MMX, SIMD, and SSE, or other operations. The floating point ALU 612 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 622, 624. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 7:
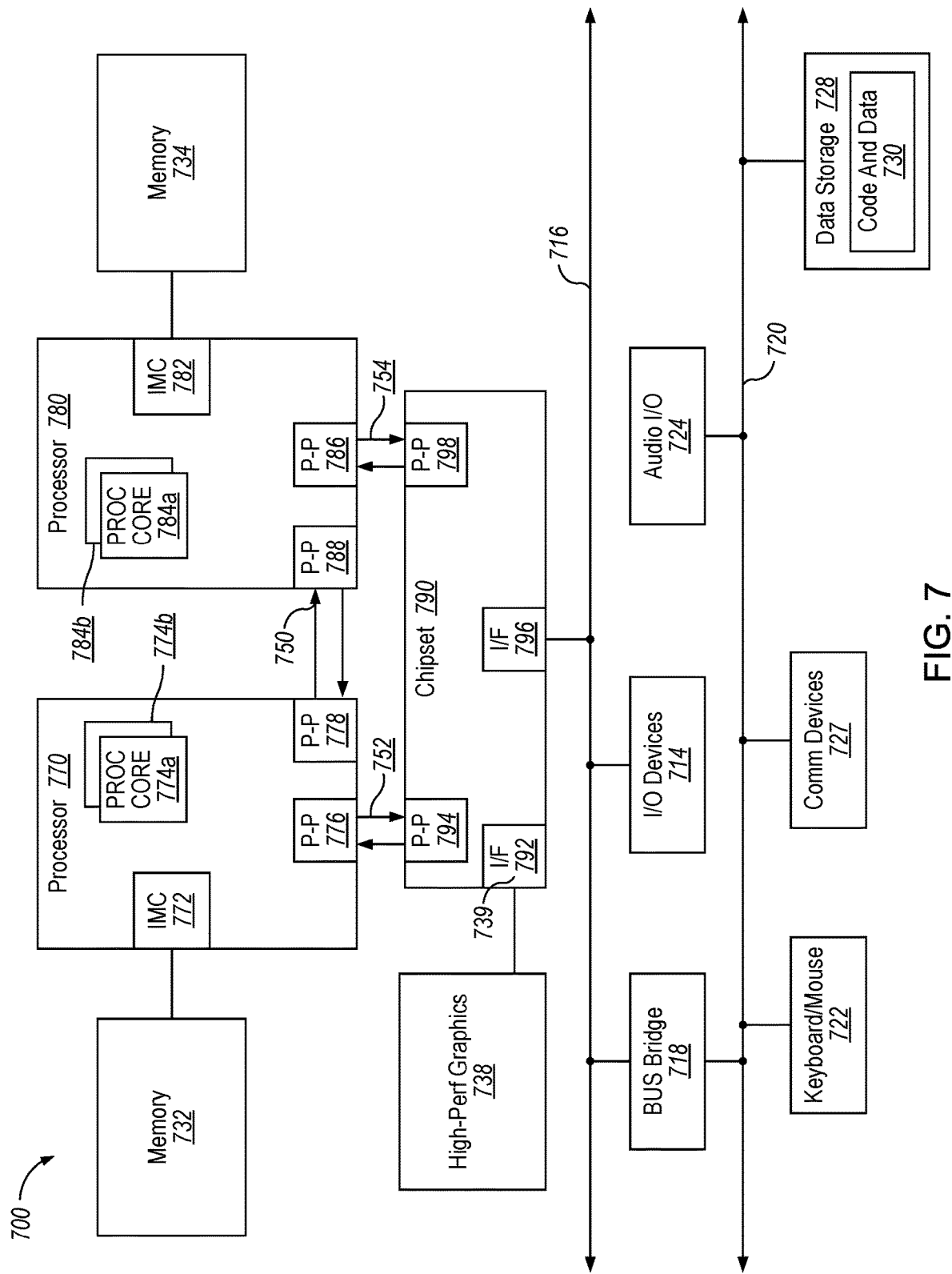
FIG. 7 is a block diagram of a computer system according to one implementation.

Implementations may be implemented in many different system types. Referring now to FIG. 7, shown is a block diagram of a multiprocessor system 700 that may implement hardware support for enforcing unique page table permissions with shared page tables, in accordance with an implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. While shown with two processors 770, 780, it is to be understood that the scope of the disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

Chipset 790 may be coupled to a first bus 716 via an interface 796. In one implementation, first bus 716 may be a Peripheral Component Interconnect (PCI) bus, or a bus such as a PCI Express bus or interconnect bus, although the scope of the disclosure is not so limited.

Figure 8:
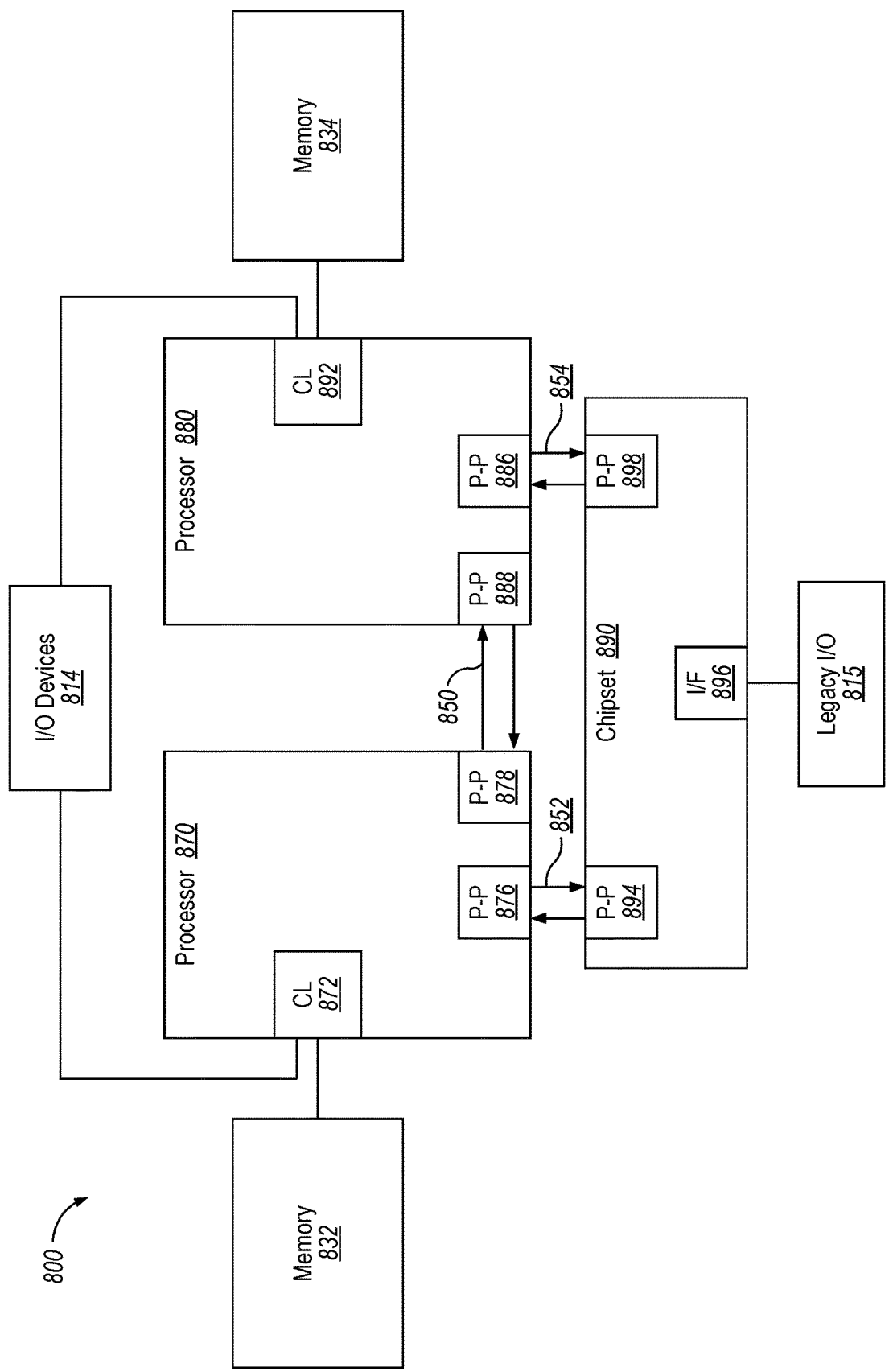
FIG. 8 is a block diagram of a computer system according to another implementation.

Referring now to FIG. 8, shown is a block diagram of a third system 800 that may implement hardware support for enforcing unique page table permissions with shared page tables, in accordance with an implementation of the disclosure. Like elements in FIGS. 7 and 8 bear like reference numerals and certain aspects of FIG. 8 have been omitted from FIG. 7 in order to avoid obscuring other aspects of FIG. 7.

FIG. 8 illustrates that the processors 870, 880 may include integrated memory and I/O control logic ("CL") 872 and 892, respectively. For at least one implementation, the CL 872, 882 may include integrated memory controller units such as described herein. In addition. CL 872, 892 may also include I/O control logic. FIG. 8 illustrates that the memories 832, 834 are coupled to the CL 872, 892, and that I/O devices 814 are also coupled to the control logic 872, 892. Legacy I/O devices 815 are coupled to the chipset 890. In one implementation, CL 872 and 892 may include a filter logic circuit, as described above, to apply permissions filters associated with I/O devices 814 to enforce a unique page table permission of the I/O device 814. In another implementation, chipset 890 may include a filter logic circuit, as described above.

Figure 9:
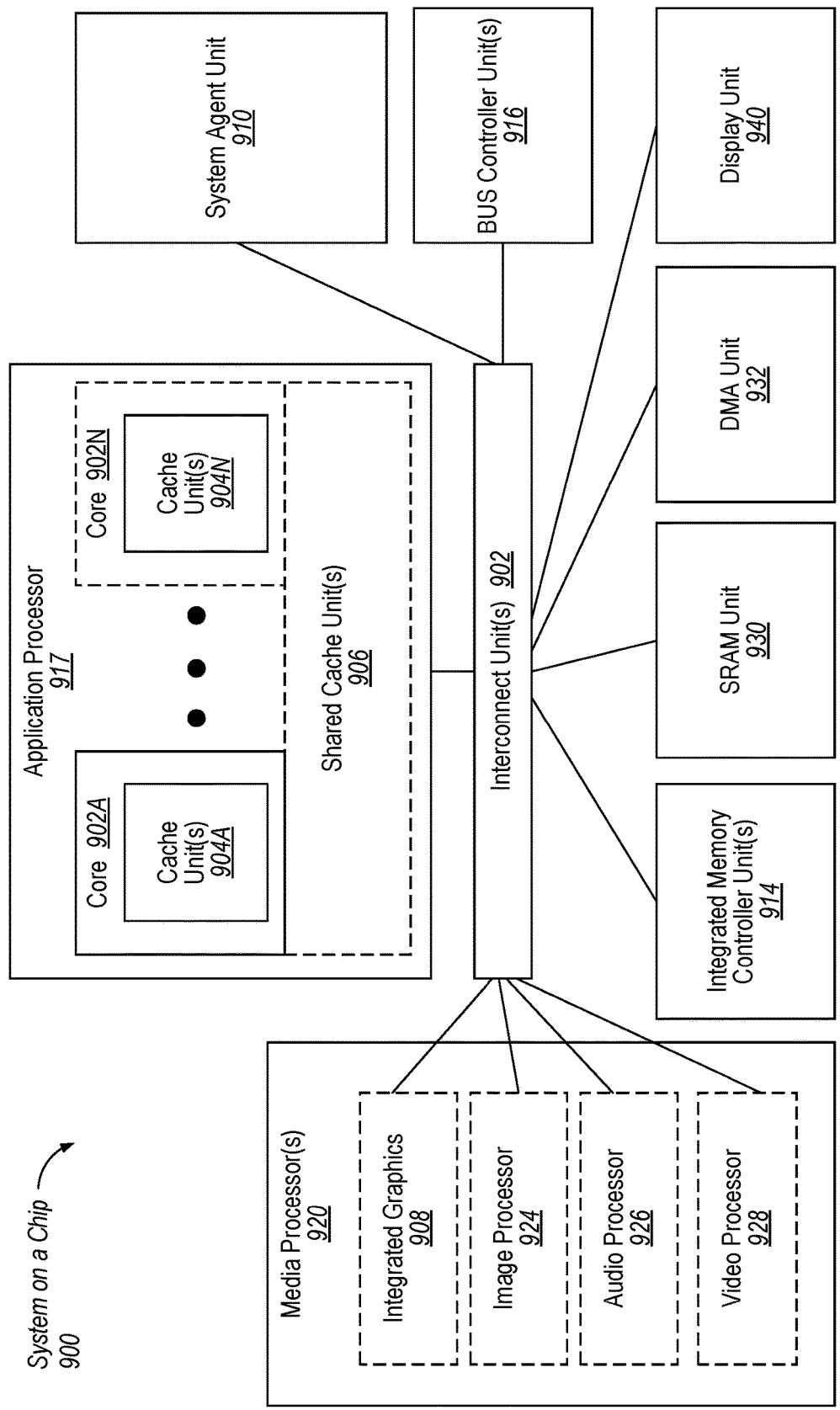
FIG. 9 is a block diagram of a system-on-a-chip according to one implementation.

FIG. 9 is an exemplary system on a chip (SoC) 900 that may include one or more of the cores 902A . . . 902N that may implement hardware support for enforcing unique page table permissions with shared page tables. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 900 of FIG. 9, dashed lined boxes are features on more advanced SoCs. An interconnect unit(s) 902 may be coupled to: an application processor 917 which includes a set of one or more cores 902A-N and shared cache unit(s) 906; a system agent unit 910; a bus controller unit(s) 916; an integrated memory controller unit(s) 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
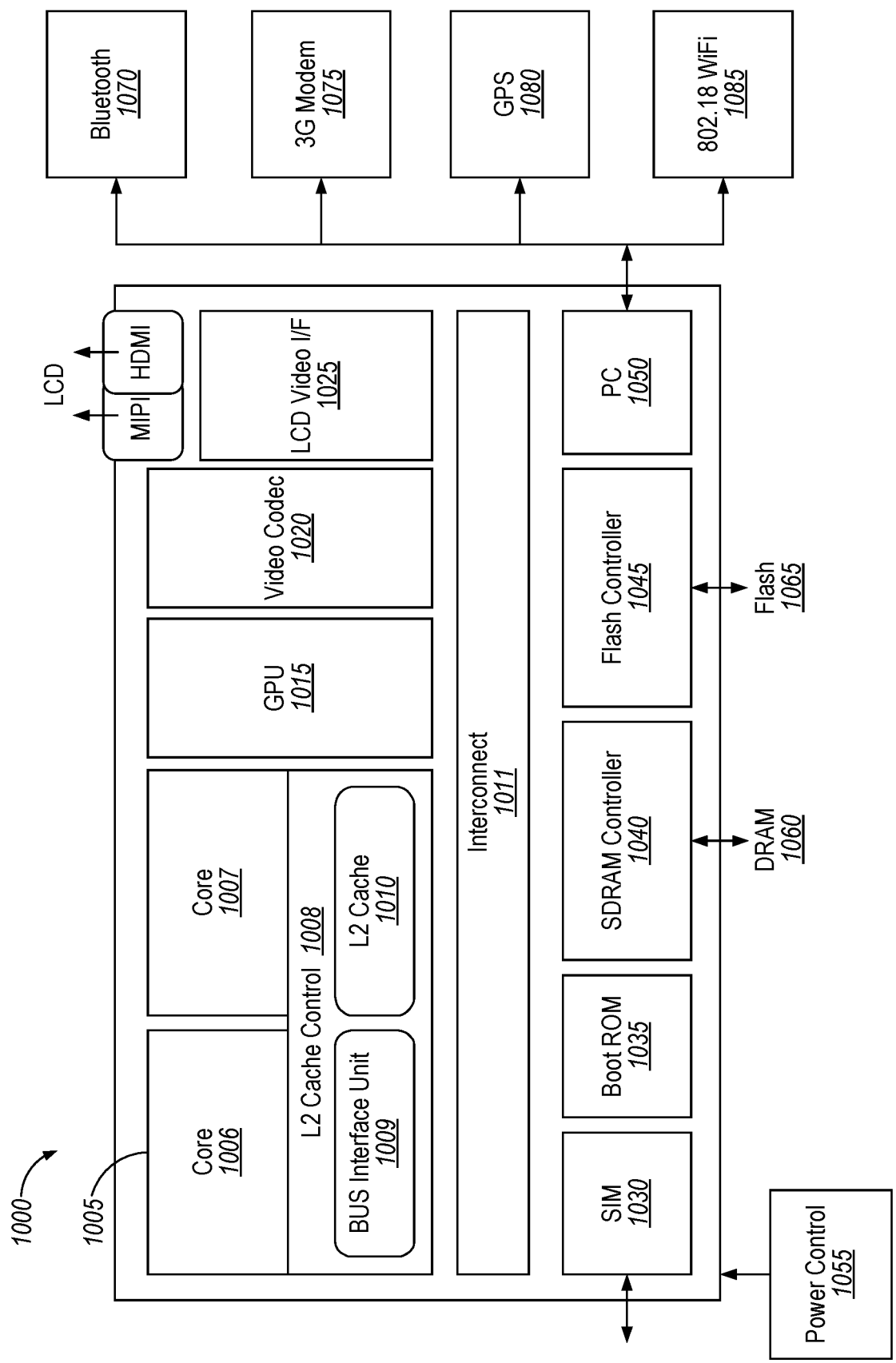
FIG. 10 illustrates another implementation of a block diagram for a computing system.

Turning next to FIG. 10, an implementation of a system on-chip (SoC) design that may implement hardware support for enforcing unique page table permissions with shared page tables, in accordance with implementations of the disclosure is depicted. As an illustrative example, SoC 1000 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

In one implementation, SDRAM controller 1040 may connect to interconnect 1011 via cache 1010. Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the implementations described herein.

In addition, the system illustrates peripherals for communication, such as a Bluetooth® module 1070, 3G modem 1075, GPS 1080, and Wi-Fi® 1085. Note as stated above, a UE includes a radio for communication. As a result, these peripheral communication modules may not all be included. However, in a UE some form of a radio for external communication should be included.

Figure 11:
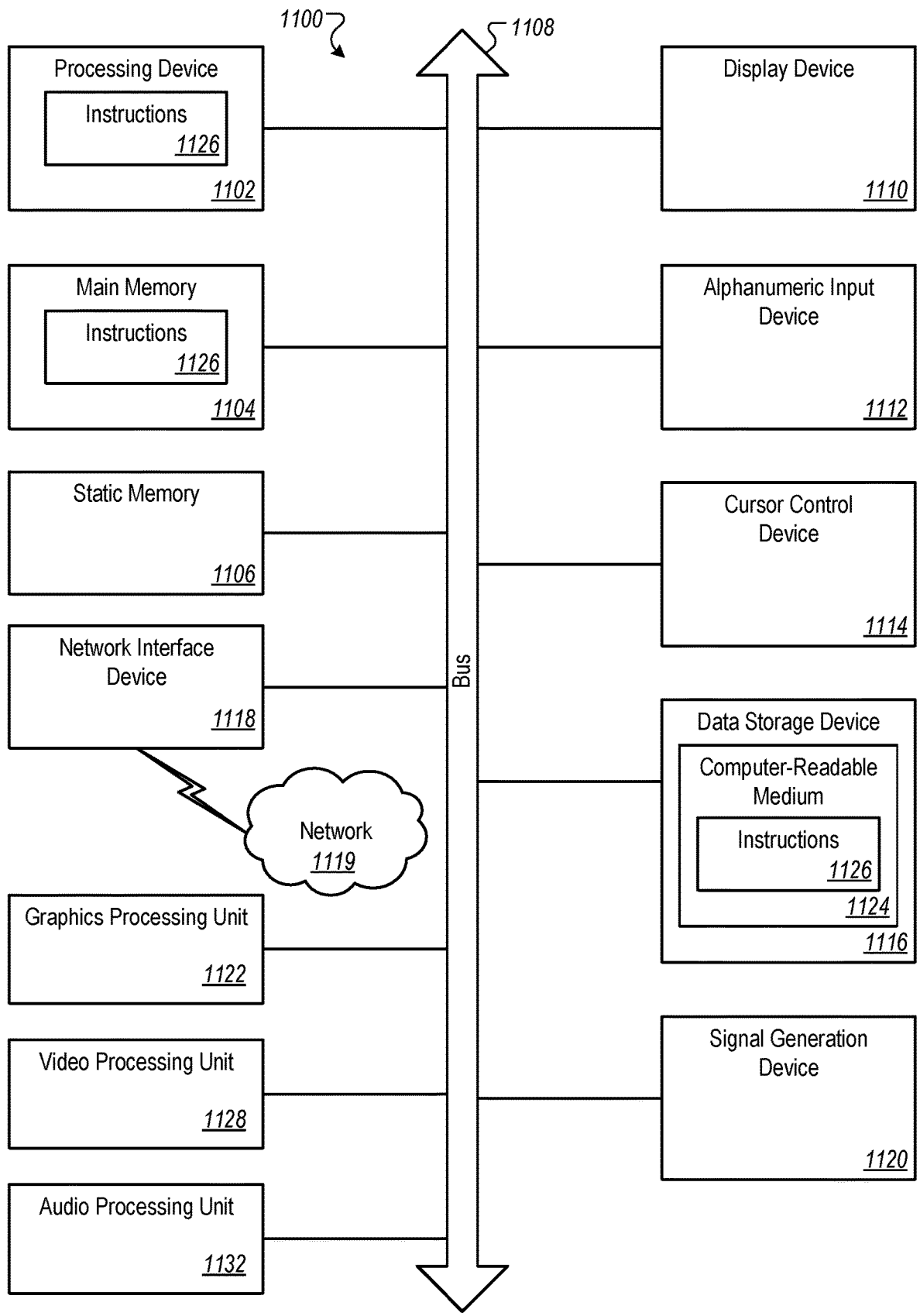
FIG. 11 illustrates another implementation of a block diagram for a computing system.

FIG. 11 illustrates a diagrammatic representation of a machine in the example form of a computing system 1100 within which a set of instructions, for causing the machine to implement hardware support for enforcing unique page table permissions with shared page tables according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1100.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application-specific integrated circuit (ASIC), a field programmable gate array (FPGA), a digital signal processor (DSP), network processor, or the like. In one implementation, processing device 1102 may include one or more processor cores. The processing device 1102 is configured to execute the processing logic 1126 for performing the operations discussed herein.

In one implementation, processing device 1102 can be part of a processor or an integrated circuit that includes the disclosed LLC caching architecture. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another implementation, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, and/or a software library containing methods that call the above applications. While the computer-readable storage medium 1124 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processor comprising: a processing core; a filter register to store a first permissions filter; and a memory management unit (MMU), coupled to the processing core, the filter register and a first peripheral device associated with the first permissions filter, wherein the MMU comprises a logic circuit to manage a shared page table comprising entries corresponding to the processing core and the first peripheral device, wherein the logic circuit is to: receive a memory access request for a first page of memory from the first peripheral device; determine whether a set of permission bits of a first entry of the shared page table match a first combination of bits of the first permissions filter, wherein the first combination of bits of the first permissions filter defines an access permission for the first peripheral device; grant the memory access request responsive to the set of permission bits of the first entry matching the first combination of bits of the first permissions filter; and cause a page fault responsive to the set of permission bits of the first entry not matching the first combination of bits of the first permissions filter.

In Example 2, the subject matter of Example 1, wherein the set of permission bits of the first entry comprises one or more software bits that define access permission for the first page of memory.

In Example 3, the subject matter of any one of Examples 1-2, wherein the set of permission bits of the first entry comprises a first set of software bits and a second set of hardware bits, wherein the set of permission bits define access permission for the first page of memory.

In Example 4, the subject matter of any one of Examples 1-3, wherein the filter register is to store a second permissions filter associated with a second peripheral device coupled to the MMU, wherein the logic circuit is further to: receive a second memory access request for the first page of memory from the second peripheral device; determine whether the set of permission bits of the first entry match a second combination of bits of the second permissions filter, wherein the second combination of bits defines an access permission for the second peripheral device, wherein the first combination of bits is different than the second combination of bits; the second memory access request responsive to the set of permission bits of the first entry matching the second combination of bits of the second permissions filter; and cause a page fault responsive to the set of permission bits of the first entry not matching the second combination of bits of the second permissions filter.

In Example 5, the subject matter of any one of Examples 1-4, wherein the logic circuit is further to: receive a second memory access request for the first page of memory from the processing core; determine whether the set of permission bits of the first entry indicate access permission of the processing core to the first page of memory; grant the second memory access request responsive to the set of permission bits of the first entry indicating access permission of the processing core to the first page of memory; and cause a page fault responsive to the set of permission bits of the first entry indicating that the processing core does not have access permission to the page of memory.

In Example 6, the subject matter of any one of Examples 1-5, wherein the logic circuit comprises: a first comparator to compare the first combination of bits of the first permissions filter with the set of permission bits of the first entry of the shared page table and to provide an output comprising an intermediate set of bits that the first combination of bits and the set of permission bits have in common; and a second comparator to compare the intermediate set of bits of the output of the first comparator with the first combination of bits of the first permissions filter, wherein the memory access request is granted if the intermediate set of bits of the output of the first comparator matches the first combination of bits of the first permissions filter.

In Example 7 the subject matter of any one of Examples 1-6, wherein the logic circuit comprises a comparator to compare a first bit of the combination of bits of the first permissions filter with a corresponding second bit of the set of permission bits of the first entry, wherein the first memory access request is granted if the first bit matches the corresponding second bit.

In Example 8, the subject matter of any one of Examples 1-7, further comprising a root entry table, wherein the root entry table maps to a context table, wherein the context table comprises a first context entry in which the first peripheral device is associated with the first permissions filter.

In Example 9, the subject matter of any one of Examples 1-8, wherein the first peripheral device and a second peripheral device are both associated with the first permissions filter in the first context entry.

Various implementations may have different combinations of the structural features described above. For instance, all optional features of the processors and methods described above may also be implemented with respect to a system described herein and specifics in the examples may be used anywhere in one or more implementations.

Example 10 is a system comprising: a memory to store a shared page table; a first peripheral device coupled to the memory; a second peripheral device coupled to the memory; and a memory management unit (MMU) coupled to the memory, the first peripheral device, and the second peripheral device, wherein the MMU comprises: a first permissions filter, wherein the first permissions filter comprises a first combination of bits that define an access permission for the first peripheral device to first page of memory associated with a first entry of the shared page table; and a second permissions filter, wherein the second permissions filter comprises a second combination of bits that define an access permission for the second peripheral device to the first page of memory associated with the first entry of the shared page table, wherein the first combination of bits is different than the second combination of bits.

In Example 11, the subject matter of Example 10, wherein the MMU further comprises a logic circuit to: receive a memory access request for the first page of memory from the first peripheral device, wherein the first page of memory is associated with the first entry of the shared page table; determine whether a set of permission bits of the first entry match the first combination of bits of the first permissions filter; grant the memory access request responsive to the set of permission bits of the first entry matching the first combination of permission bits of the first permissions filter; and cause a page fault responsive to the set of permission bits of the first entry not matching the first combination of bits of the first permissions filter.

In Example 12 the subject matter of any one of Examples 10-11, wherein the set of permission bits of the first entry comprises a first set of software bits that define the access permission of the first peripheral device to the first page of memory and the access permission of the second peripheral device to the first page of memory, and a second set of hardware bits that define access permission of a legacy device to the first page of memory.

In Example 13, the subject matter of any one of Examples 10-12, wherein the logic circuit is further to: receive a second memory access request to the first page of memory from the second peripheral device; determine whether the set of permission bits of the first entry match the second combination of bits of the second permissions filter; grant the memory access request responsive to the set of permission bits of the first entry matching the second combination of permission bits of the second permissions filter; and cause a page fault responsive to the set of permission bits of the first entry not matching the second combination of bits of the second permissions filter.

In Example 14, the subject matter of any one of Examples 10-13, wherein a first software bit of the first entry indicates write permissions of the first peripheral device to the first page of memory, and a second software bit indicates the write permissions of the second peripheral device to the first page of memory.

In Example 15, the subject matter of any one of Examples 10-14, wherein the logic circuit further comprises logic to update the memory translation structure to indicate that the first permissions filter has been applied to the first entry.

In Example 16, the subject matter of any one of Examples 10-15, wherein the logic circuit is further to: receive a second memory access request for the first page of memory from a central processing unit (CPU); determine whether the second set of hardware bits of the first entry indicates that the CPU is allowed access to the first page of memory; grant the second memory access request responsive to the second set of hardware bits indicating that the CPU is allowed access to the first page of memory; and cause a page fault responsive to the second set of hardware bits indicating that the CPU is not allowed access to the first page of memory.

Various implementations may have different combinations of the structural features described above. For instance, all optional features of the processors and methods described above may also be implemented with respect to a system described herein and specifics in the examples may be used anywhere in one or more implementations.

Example 17 is a method comprising: receiving a first memory access request for a first page of memory from a first device associated with a first permissions filter, wherein the first permissions filter comprises a first combination of bits that define an access permission for the first peripheral device to the first page of memory; determine whether a set of permission bits of a first entry of a page table match the first combination of bits of the first permissions filter, wherein the page table is shared by the first device and a second device; granting the memory access request responsive to the set of permission bits of the first entry matching the first combination of bits of the first permissions filter; and causing a page fault responsive to the set of permission bits of the first entry not matching the first combination of bits of the first permissions filter.

In Example 18, the subject matter of Example 17, further comprising: receiving a second memory access request for the first page of memory from a second device associated with a second permissions filter, wherein the second permissions filter comprises a second combination of bits that define an access permission for the second device to the first page of memory; determine whether the set of permission bits of the first entry match the second combination of bits of the second permissions filter; granting the memory access request responsive to the set of permission bits of the first entry matching the second combination of bits of the second permissions filter; and causing a page fault responsive to the set of permission bits of the first entry not matching the second combination of bits of the second permissions filter.

In Example 19, the subject matter of any one of Examples 17-18, wherein applying the first permissions filter to the set of permission bits of the first entry of the page table comprises: comparing the first combination of bits of the first permissions filter to the set of permission bits of the first entry of the page table to provide an output comprising a set of bits that the first combination of bits of the permissions filter and the set of permission bits of the first entry of the page table have in common; comparing the set of bits of the output to the first combination of bits of the first permissions filter to determine if the set of bits of the output and the first combination of bits of the first permissions filter match; and responsive to determining that the output and the permissions filter match, granting the memory access request to the first page of memory.

In Example 20, the subject matter of any one of Examples 17-19, further comprising updating the first entry of the page table to indicate that the first permissions filter has been applied to the first entry of the page table.

Example 21 is a system comprising means to perform a method of any one of the Examples 17-20.

Example 22 is at least one non-transitory machine readable storage medium comprising a plurality of instructions, when executed, to implement a method or realize an apparatus of any one of Examples 17-20.

Example 23 is an apparatus comprising a processor configured to perform the method of any one of Examples 17-20.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processing core;
   a filter register to store a first permissions filter; and
   a memory management unit (MMU), coupled to the processing core, the filter register and a first peripheral device associated with the first permissions filter, wherein the MMU comprises a logic circuit to manage a shared page table comprising entries corresponding to the processing core and the first peripheral device, wherein the logic circuit is to:
   receive a memory access request for a first page of memory from the first peripheral device;

determine whether a set of permission bits of a first entry of the shared page table match a first combination of bits of the first permissions filter, wherein the set of permission bits of the first entry defines access permission for the first page of memory and comprises a first set of software bits and a second set of hardware bits, and wherein the first combination of bits of the first permissions filter defines an access permission for the first peripheral device;

grant the memory access request responsive to the set of permission bits of the first entry matching the first combination of bits of the first permissions filter; and cause a page fault responsive to the set of permission bits of the first entry not matching the first combination of bits of the first permissions filter.

2. The processor of claim 1, wherein the filter register is to store a second permissions filter associated with a second peripheral device coupled to the MMU, wherein the logic circuit is further to:

receive a second memory access request for the first page of memory from the second peripheral device;

determine whether the set of permission bits of the first entry match a second combination of bits of the second permissions filter, wherein the second combination of bits defines an access permission for the second peripheral device, wherein the first combination of bits is different than the second combination of bits;

grant the second memory access request responsive to the set of permission bits of the first entry matching the second combination of bits of the second permissions filter; and cause a page fault responsive to the set of permission bits of the first entry not matching the second combination of bits of the second permissions filter.

3. The processor of claim 1, wherein the logic circuit is further to:

receive a second memory access request for the first page of memory from the processing core;

determine whether the set of permission bits of the first entry indicate access permission of the processing core to the first page of memory;

grant the second memory access request responsive to the set of permission bits of the first entry indicating access permission of the processing core to the first page of memory; and cause a page fault responsive to the set of permission bits of the first entry indicating that the processing core does not have access permission to the page of memory.

4. The processor of claim 1, wherein the logic circuit comprises:

a first comparator to compare the first combination of bits of the first permissions filter with the set of permission bits of the first entry of the shared page table and to provide an output comprising an intermediate set of bits that the first combination of bits and the set of permission bits have in common; and a second comparator to compare the intermediate set of bits of the output of the first comparator with the first combination of bits of the first permissions filter, wherein the memory access request is granted if the intermediate set of bits of the output of the first comparator matches the first combination of bits of the first permissions filter.

5. The processor claim 1, wherein the logic circuit comprises a comparator to compare a first bit of the combination of bits of the first permissions filter with a corresponding second bit of the set of permission bits of the first entry, wherein the first memory access request is granted if the first bit matches the corresponding second bit.

6. The processor of claim 1, further comprising a root entry table, wherein the root entry table maps to a context table, wherein the context table comprises a first context entry in which the first peripheral device is associated with the first permissions filter.

7. The processor of claim 6, wherein the first peripheral device and a second peripheral device are both associated with the first permissions filter in the first context entry.

8. A system comprising:

a memory to store a shared page table;

a first peripheral device coupled to the memory;

a second peripheral device coupled to the memory; and a memory management unit (MMU) coupled to the memory, the first peripheral device, and the second peripheral device, wherein the MMU comprises:

a first permissions filter, wherein the first permissions filter comprises a first combination of bits that define an access permission for the first peripheral device to first page of memory associated with a first entry of the shared page table;

a second permissions filter, wherein the second permissions filter comprises a second combination of bits that define an access permission for the second peripheral device to the first page of memory associated with the first entry of the shared page table, wherein the first combination of bits is different than the second combination of bits; and a logic circuit to:

receive a memory access request for the first page of memory from the first peripheral device, wherein the first page of memory is associated with the first entry of the shared page table;

determine whether a set of permission bits of the first entry match the first combination of bits of the first permissions filter, wherein the set of permission bits of the first enty defines access permission for the first page of memory and comprises a first set of software bits and a second set of hardware bits;

grant the memory access request responsive to the set of permission bits of the first entry matching the first combination of permission bits of the first permissions filter; and cause a page fault responsive to the set of permission bits of the first entry not matching the first combination of bits of the first permissions filter.

9. The system of claim 8, wherein the first set of software bits defines the access permission of the first peripheral device to the first page of memory and the access permission of the second peripheral device to the first page of memory, and the second set of hardware bits defines access permission of a legacy device to the first page of memory.

10. The system of claim 8, wherein the logic circuit is further to:

receive a second memory access request to the first page of memory from the second peripheral device;

determine whether the set of permission bits of the first entry matches the second combination of bits of the second permissions filter;

grant the second memory access request responsive to the set of permission bits of the first entry matching the second combination of permission bits of the second permissions filter; and cause a page fault responsive to the set of permission bits of the first entry not matching the second combination of bits of the second permissions filter.

11. The system of claim 9, wherein a first software bit of the first entry indicates write permissions of the first peripheral device to the first page of memory, and a second software bit indicates the write permissions of the second peripheral device to the first page of memory.

12. The system of claim 9, wherein the logic circuit further comprises logic to update the first entry of the shared page table to indicate that the first permissions filter has been applied to the first entry.

13. The system of claim 9, wherein the logic circuit is further to:
receive a second memory access request for the first page of memory from a central processing unit (CPU);
determine whether the second set of hardware bits of the first entry indicates that the CPU is allowed access to the first page of memory;
grant the second memory access request responsive to the second set of hardware bits indicating that the CPU is allowed access to the first page of memory; and
cause a page fault responsive to the second set of hardware bits indicating that the CPU is not allowed access to the first page of memory.

14. A method of operation comprising:
receiving a first memory access request for a first page of memory from a first device associated with a first permissions filter, wherein the first permissions filter comprises a first combination of bits that define an access permission for the first device to the first page of memory;
determine whether a set of permission bits of a first entry of a page table match the first combination of bits of the first permissions filter, wherein the set of permission bits of the first entry defines access permission for the first page of memory and comprises a first set of software bits and a second set of hardware bits, and wherein the page table is shared by the first device and a second device;
granting the memory access request responsive to the set of permission bits of the first entry matching the first combination of bits of the first permissions filter; and
causing a page fault responsive to the set of permission bits of the first entry not matching the first combination of bits of the first permissions filter.

15. The method of claim 14, further comprising:
receiving a second memory access request for the first page of memory from the second device associated with a second permissions filter, wherein the second permissions filter comprises a second combination of bits that define an access permission for the second device to the first page of memory;
determine whether the set of permission bits of the first entry matches the second combination of bits of the second permissions filter;
granting the second memory access request responsive to the set of permission bits of the first entry matching the second combination of bits of the second permissions filter; and
causing a page fault responsive to the set of permission bits of the first entry not matching the second combination of bits of the second permissions filter.

16. The method of claim 14, wherein applying the first permissions filter to the set of permission bits of the first entry of the page table comprises:
comparing the first combination of bits of the first permissions filter to the set of permission bits of the first entry of the page table to provide an output comprising a set of bits that the first combination of bits of the permissions filter and the set of permission bits of the first entry of the page table have in common;
comparing the set of bits of the output to the first combination of bits of the first permissions filter to determine if the set of bits of the output and the first combination of bits of the first permissions filter match; and
responsive to determining that the output and the permissions filter match, granting the memory access request to the first page of memory.

17. The method of claim 14, further comprising updating the first entry of the page table to indicate that the first permissions filter has been applied to the first entry of the page table.

* * * * *